United States Patent
Robinson et al.

(10) Patent No.: US 12,337,542 B2
(45) Date of Patent: Jun. 24, 2025

(54) THREE-DIMENSIONAL PRINTING DEVICE FOR PRINTING POLYURETHANE ARTICLES

(71) Applicant: Evoco Limited, Toronto (CA)

(72) Inventors: Jason James Robinson, Toronto (CA); Syed Muhammad Husainie, Etobicoke (CA); Adel Kakroodi, Toronto (CA)

(73) Assignee: Evoco Limited, Toronto (CA)

( * ) Notice: Subject to any disclaimer, the term of this patent is extended or adjusted under 35 U.S.C. 154(b) by 145 days.

(21) Appl. No.: 17/957,472

(22) Filed: Sep. 30, 2022

(65) Prior Publication Data

US 2023/0101431 A1    Mar. 30, 2023

Related U.S. Application Data

(60) Provisional application No. 63/250,573, filed on Sep. 30, 2021.

(51) Int. Cl.
| | |
|---|---|
| *B29C 64/314* | (2017.01) |
| *B29C 64/106* | (2017.01) |
| *B29C 64/209* | (2017.01) |
| *B29C 64/35* | (2017.01) |
| *B33Y 10/00* | (2015.01) |
| *B33Y 30/00* | (2015.01) |
| *B33Y 40/10* | (2020.01) |
| *B29K 75/00* | (2006.01) |

(52) U.S. Cl.
CPC .......... *B29C 64/314* (2017.08); *B29C 64/106* (2017.08); *B29C 64/209* (2017.08); *B29C 64/35* (2017.08); *B33Y 10/00* (2014.12); *B33Y 30/00* (2014.12); *B33Y 40/10* (2020.01); *B29K 2075/00* (2013.01)

(58) Field of Classification Search
CPC .... B29C 64/314; B29C 64/106; B29C 64/209
See application file for complete search history.

(56) References Cited

U.S. PATENT DOCUMENTS

| | | | | |
|---|---|---|---|---|
| 2,953,359 | A | * | 9/1960 | Mau ...................... B01F 25/721 366/315 |
| 3,400,915 | A | * | 9/1968 | Onishi ................ B01F 25/7411 525/62 |
| 3,420,506 | A | * | 1/1969 | Gurley, Jr. ............ B29B 7/7414 415/72 |
| 6,877,967 | B2 | | 4/2005 | Gantenhammer |
| 10,173,410 | B2 | | 1/2019 | Nardiello et al. |
| 10,639,842 | B2 | | 5/2020 | Leibig et al. |
| 2015/0352787 | A1 | * | 12/2015 | Humbert ............... B29C 64/106 425/375 |
| 2018/0339478 | A1 | * | 11/2018 | Lee ........................ B33Y 40/10 |

(Continued)

*Primary Examiner* — Galen H Hauth
*Assistant Examiner* — Mohamed K Ahmed Ali

(57) ABSTRACT

A 3D printing device includes: a travelling dispenser including: a mixing chamber, a nozzle, a first gear pump, and a second gear pump, each of the first gear pump, the second gear pump and nozzle being in respective fluid communication with the mixing chamber; a first polyurethane reagent supply in fluid communication with the first gear pump; and a second polyurethane reagent supply in fluid communication with the second gear pump. The first polyurethane reagent supply accommodates a polyol mixture, and the second polyurethane reagent supply accommodates a diisocyanate.

21 Claims, 7 Drawing Sheets

(56) References Cited

U.S. PATENT DOCUMENTS

| | | | |
|---|---|---|---|
| 2019/0039299 A1* | 2/2019 | Busbee | B33Y 70/00 |
| 2021/0039306 A1* | 2/2021 | Busbee | B29C 64/336 |
| 2021/0039399 A1* | 2/2021 | Busbee | B29C 64/209 |
| 2022/0126516 A1* | 4/2022 | Kutchko | B29B 7/7457 |
| 2023/0241833 A1* | 8/2023 | Mackay | B29C 64/106 |
| | | | 264/176.1 |

* cited by examiner

THREE-DIMENSIONAL PRINTING DEVICE FOR PRINTING POLYURETHANE ARTICLES

CROSS-REFERENCE TO RELATED APPLICATION

This application claims the benefit of U.S. Provisional Application No. 63/250,573 filed on Sep. 30, 2021, the content of which is incorporated herein by reference in its entirety.

FIELD

The subject disclosure relates generally to three-dimensional printing and in particular, to a three-dimensional printing device for printing polyurethane articles.

BACKGROUND

Three-dimensional (3D) printing is a process for manufacturing solid articles by depositing successive layers of material using a printing device. The printing device is typically driven by processing structure, such as computer, running a software program. 3D printing is currently used for low-cost rapid prototyping, product development and manufacturing, and finds application in a variety of technical areas such as architecture, engineering, medical, dental, automotive, aerospace, consumer goods and industrial goods. Many different 3D printing technologies are known. One such 3D printing technology is fused deposition modelling (FDM), which involves printing by extrusion of thermoplastic polymer materials, polymer composites, post-curable thermoset materials, and/or photo reactive resins that are subsequently cured with UV lasers.

Polyurethanes are a large class of polymers used in a wide range of applications, such as construction, automotive, furniture, footwear, insulation, coatings, adhesives, elastomer foams, and consumer goods. Polyurethanes are produced from the polymerization reaction between polyols and diisocyanates. Usually, the polyols are hydroxyl-terminated oligomers or polymers, such as poly (ethylene oxide), poly (propylene oxide), poly (alkylene glycols) or polyester resin with terminal hydroxyl groups. Commonly-used diisocyanates are toluene-diisocyanate, 4,4'-methylene diphenyl diisocyanate, isophorone diisocyanate and hexamethylene diisocyanate. The properties of polyurethanes vary depending on the structure of the polymer backbone, and can be tailored to have high strength and rigidity, or high flexibility and toughness. When a polyol reacts with a diisocyanate, it forms a linear, thermoplastic polymer. If crosslinking agents are used (such as di-ethanol amine, polyhydric alcohol or polyols with three or more hydroxyl moieties and/or polyisocyanates with 3 reactive isocyanate groups), then the degree of crosslinking in the polyurethane product can be tailored to achieve a rigid, cross-linked, thermosetting polyurethane. Additionally, additives are commonly added during the reaction of the polyurethane to improve certain properties. These additives include chain-extending agents, blowing agents, surfactants, fillers, plasticizers, pigments, flame retardants, and others. Blowing agents are used to create a polyurethane foam, and surfactants are used to control the bubble formation and, therefore, the cell formation of the foam. In general, fillers are used to increase stiffness, plasticizers are used to reduce hardness, and pigments are used to add colour.

A variety of aromatic and aliphatic polyisocyanates exist. The most commonly-used polyisocyanates are toluene diisocyanate (TDI) and 4,4'-methylene diphenyl diisocyanate (MDI), which are used in the production of around 95% of all polyurethanes. TDI is typically used in the production of soft, flexible foams for cushioning, while MDI is typically used in the production of more versatile, rigid polyurethanes. Other less commonly-used diisocyanates, such as the aliphatic hexamethylene diisocyanate or cycloaliphatic isophorone diisocyanates, are known and are used in polyurethane compositions for specialty applications, such as enamel paints and coatings that are resistant to abrasion or degradation by ultraviolet light.

3D printing of polyurethane articles is known. For example, U.S. Patent Application Publication No. 2018/0339478 to Lee describes an upper with 3dimensional (3D) polyurethane (PU) patterns, a method for manufacturing the same and a shoe produced by the same. A semi-finished upper is first provided. Then, at least one 3D printer is provided, and PU is used as the 3D printing material for printing at least one PU decorative unit on a surface of the semi-finished upper. The PU decorative unit is then cured to get an upper with 3D PU patterns. The upper is used to produce a shoe.

U.S. Pat. No. 10,639,842 to Leibig et al. describes a three-dimensional (3D) object production system, and methods for 3D printing reactive components to form a thermoset product. The methods use a 3D printer having a controller comprising one or more processors to print a 3D object. Also described are a 3D object production system and methods for 3D printing in which one or more parameters of an at least one actuator are adjusted to produce a 3D object based on a reaction rate between reactive components.

U.S. Pat. No. 10,173,410 to Nardiello et al. describes a process and device for 3D printing parts incorporating long-fiber reinforcements in an advanced composite material. A nozzle for a 3D printing device receives a polymer material and a reinforcing fiber through separate inlets. A passage from the reinforcing fiber inlet cleaves the passage containing the polymer material, creating an interstitial cavity into which the reinforcing fiber is introduced. The polymer material closes back on itself and encapsulates the reinforcing fiber, then drags the fiber along with the flow and exits nozzle to be deposited on a work surface or part being manufactured.

Single rotor-screw pumps for polymer extrusion have also been described. For example, U.S. Pat. No. 6,877,967 to Gantenhammer describes an eccentric single-rotor screw pump including a stator, and an eccentric screw rotatably arranged within the stator and which can be moved by a drive via a propeller shaft means in the rotational direction, so that the stator in cooperation with the eccentric screw conveys a volume flow. Also described is a method for producing an eccentric single-rotor screw pump and a propeller shaft means for an eccentric single-rotor screw pump.

There is an overall need for prototyping and manufacturing of polyurethane articles by 3D printing, for both the thermoplastic and thermosetting types of polyurethane. Although approaches for 3D printing polyurethane articles are known, such known approaches lack the ability to provide a wide range of polyurethane compositions. Such known approaches also lack the ability to provide cleaning and regeneration of the 3D printhead for rapid turn-around and reuse for a different application.

Accordingly, it is an object at least to provide a novel 3D printing device for printing polyurethane articles.

SUMMARY

The following is directed to a 3D printing device and method for the fabrication of polyurethane articles as thermoplastics or thermoset composites. The printing device comprises three tanks, pumps, and a rotary mixing chamber. The first tank contains a polyol, a surfactant, a plasticizer, and a catalyst. The second tank contains one or more diisocyanates, and optionally a diluent. The third tank contains a cleaning solvent. At least two of the three tanks are connected to precision drive gears that feed the corresponding contents into the mixing chamber which houses a rotary screw, and which dispenses the content through a nozzle.

Accordingly, in one aspect there is provided a 3D printing device comprising: a travelling dispenser comprising: a mixing chamber, a nozzle, a first gear pump, and a second gear pump, each of the first gear pump, the second gear pump and nozzle being in respective fluid communication with the mixing chamber; a first polyurethane reagent supply in fluid communication with the first gear pump, the first polyurethane reagent supply comprising a polyol mixture; and a second polyurethane reagent supply in fluid communication with the second gear pump, the second polyurethane reagent supply comprising a diisocyanate.

Each gear pump may comprise a drive gear and a pour pressure adjustment valve.

The polyol mixture may comprises a hydroxy terminated polymer, a catalyst, and a surfactant.

The hydroxy terminated polymer may comprise one or more of: polyethylene oxide, polypropylene oxide, polyethylene-propylene oxide, a polyester resin with hydroxyl end groups, and mixtures thereof.

The catalyst may comprise one or more of: triethylamine, dimethylcyclohexylamine, N-methylmorpholine, N,N'-dimethylpiperazine, 2-(dimethylaminoethoxy)ethanol, diazabicyclo[2.2.2]octane, bismuth neodecanoate), (bis-(2-dimethylaminoethyl)ether in dipropylene glycol), tin diacetate, tin dioctoate, tin dilaurate, the dialkyl tin salts of aliphatic carboxylic acids like dibutyltin diacetate, dibutyltin dilaurate, and mixtures thereof. The surfactant may comprises one or more of: polyether-silicone oil sodium dodecylbenzene sulfonate, sodium dodecylnaphthalene sulfate, dialkylbenzenealkyl, sulfates polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxypoly(ethyleneoxy), and mixtures thereof.

The polyol mixture may further comprise one or more of: a chain extender, a blowing agent, a colorant, and a crosslinker.

The crosslinker may comprise one or more of: diethanolamine, glycerol, trimethylol propane, pentaerythritol, 1,2,4-butanetriol, thioglycolic acid, 2,6-dihydroxybenzoic acid, melamine, diglycolamine, 1,2,6-hexanetriol, glycerol, 1,1,1-trimethylolethane, 1,1,1-trimethylolpropane, pentaerythritol, triisopropanol amine, triethanol amine, tartaric acid, citric acid, malic acid, trimesic acid, trimellitic acid, trimellitic anhydride, pyromellitic acid, pyromellitic dianhydride; trimethylolpropane, trimethylolethane; pentaerythritol, polyethertriols, tartaric acid, citric acid, malic acid, trimesic acid, trimellitic acid, trimellitic anhydride, pyromellitic acid, pyromellitic dianhydride, trimethylolpropane, trimethylolethane; pentaerythritol, polyethertriols, and mixtures thereof.

The chain extender may comprise one or more of: 1,2-ethanediol, 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, 2-ethyl-2-butyl 1,3-propanediol; alkylene glycols, like ethylene glycol, propylene glycol, monoethylene glycol, diethylene glycol, monopropylene glycol, dipropylene glycol, and mixtures thereof.

The diisocyanate may comprise one or more of: hexamethylene diisocyanate, isophorone diisocyanate, cyclohexane 1,4-diisocyanate, 1-methylcyclohexane 2,4-diisocyanate, 1-methylcyclohexane 2,6-diisocyanate, dicyclohexylmethane 4,4'-diisocyanate, dicyclohexylmethane 2,4'-diisocyanate, dicyclohexylmethane 2,2'-diisocyanate, aromatic diisocyanates, tolylene 2,4-diisocyanate, tolylene 2,6-diisocyanate, diphenylmethane 4,4'-diisocyanate, diphenylmethane 2,4'-diisocyanate, diphenylmethane 2,2'-diisocyanate, diphenylmethane 4,4'-diisocyanate, urethane-modified liquid diphenylmethane 4,4'-diisocyanate, urethane-modified liquid diphenylmethane 2,4'-diisocyanate, 4,4'-diisocyanato-1,2-diphenylethane, naphthylene 1,5-diisocyanate, corresponding isomers thereof, and mixtures thereof.

The 3D printing device may further comprise: a cleaning solvent supply; and a pressurized gas source, each of the cleaning solvent supply and the pressurized gas source being in respective fluid communication with the mixing chamber. The cleaning solvent supply may comprise a cleaning solvent, the cleaning solvent comprising one or more of: dibasic esters of adipic acid, dibasic esters of glutaric acid, dibasic esters of succinic acid, mineral oils, hexane, pentane, heptane, decane, soya bean oil, Lincoln bean oil, Manchurian bean oil, maize oil, safflower oil, palm oil, linseed oil, sesame oil, perilla oil, dehydrated castor oil, olive oil, sunflower oil, rapeseed oil ethylene glycol dimethyl ether (monoglyme), bis(2-methoxyethyl) ether (diglyme), triethylene glycol dimethyl ether (triglyme), tetraethylene glycol dimethyl ether (tetraglyme), ethyl acetate, isopropyl myristate, dibutyl phthalate, dioctyl phthalate diethylhexyl phthalate, diisononyl phthalate, dimethyl phthalate, diethyl phthalate, cyclohexanoates, preferably diisononyl cyclohexanoate, diisoundecyl phthalate, and mixtures thereof.

The 3D printing device may further comprise from 2 to 10 of the travelling dispensers arranged in an array.

In another aspect, there is provided a method of 3D printing a polyurethane article comprising: introducing, using a first gear pump, a first polyurethane reagent into a mixing chamber of a travelling dispenser, the first polyurethane reagent comprising a polyol mixture; introducing, using a second gear pump, a second polyurethane reagent into the mixing chamber of the travelling dispenser, the second polyurethane reagent comprising a diisocyanate; and operating a rotor housed in the mixing chamber to mix the first polyurethane reagent and the second polyurethane reagent in the mixing chamber to form a polyurethane reagent mixture and extrude the polyurethane reagent mixture out of a nozzle onto a substrate, the extruded polyurethane reagent mixture forming at least a portion of the polyurethane article.

The travelling dispenser may be in communication with processing structure, and wherein the steps of introducing using the first gear pump, introducing using the second gear pump, and operating the rotor, are carried out in response to signals output by the processing structure.

The method may further comprise, during the operating, moving the travelling dispenser in one or more directions.

In another aspect, there is provided a polyurethane article formed using the above-defined 3D printing device or method of 3D printing.

BRIEF DESCRIPTION OF THE DRAWINGS

Embodiments will now be described more fully with reference to the accompanying drawings in which.

DETAILED DESCRIPTION OF THE INVENTION

Figure 1:
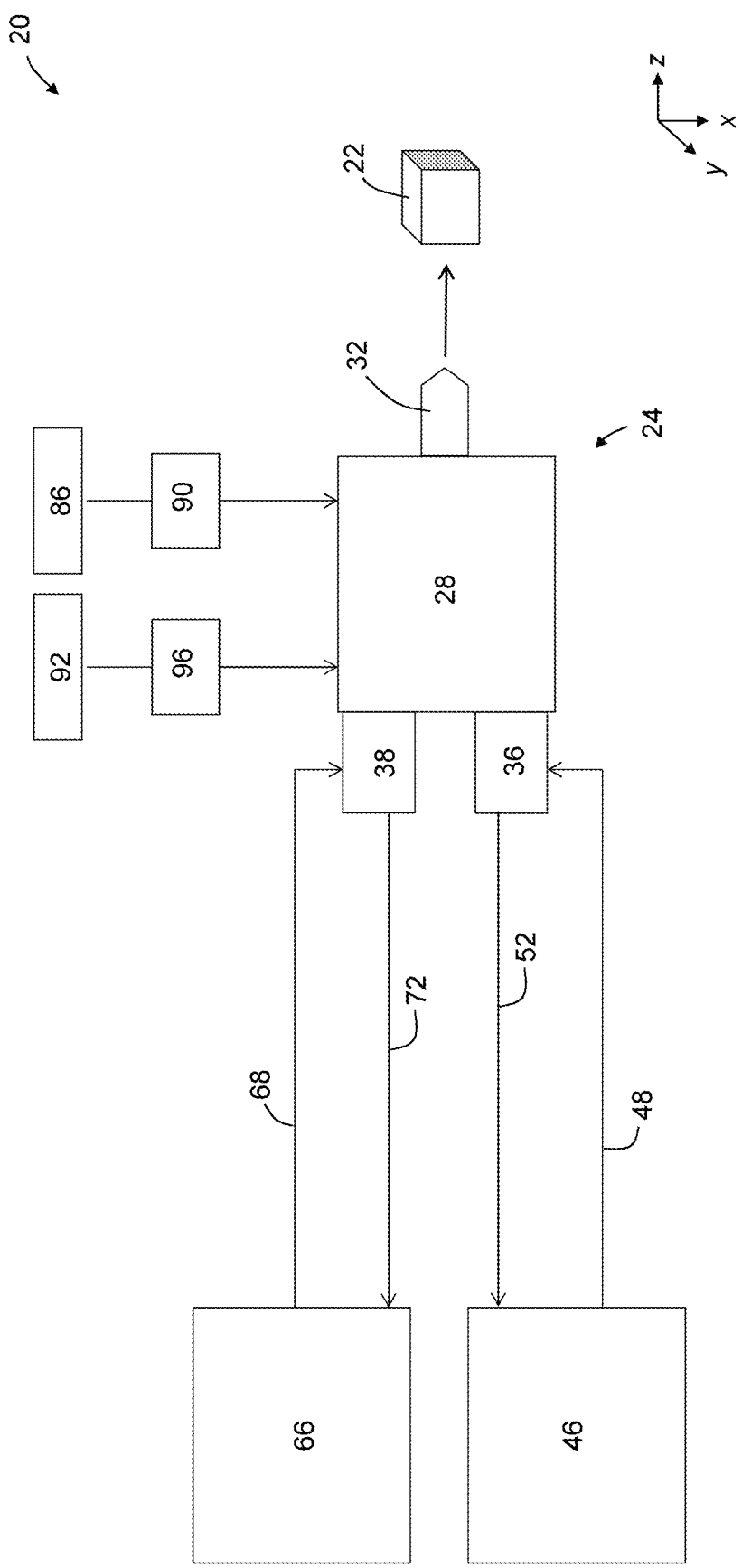
FIG. 1 is a schematic block diagram of the 3D printing device for polyurethane articles.
Figure 2:
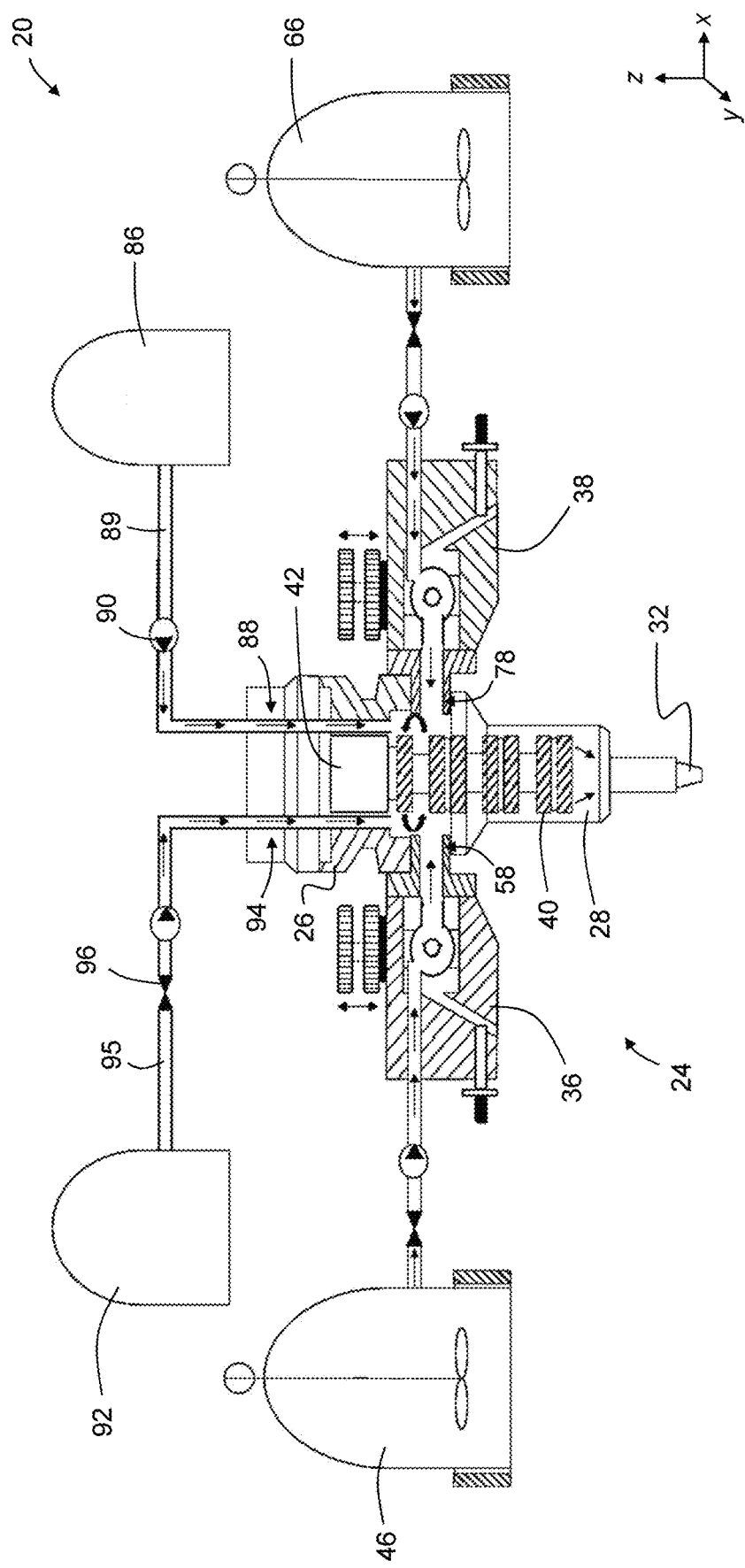
FIG. 2 is a sectional side view of a portion of the 3D printing device of FIG. 1.
Figure 3:
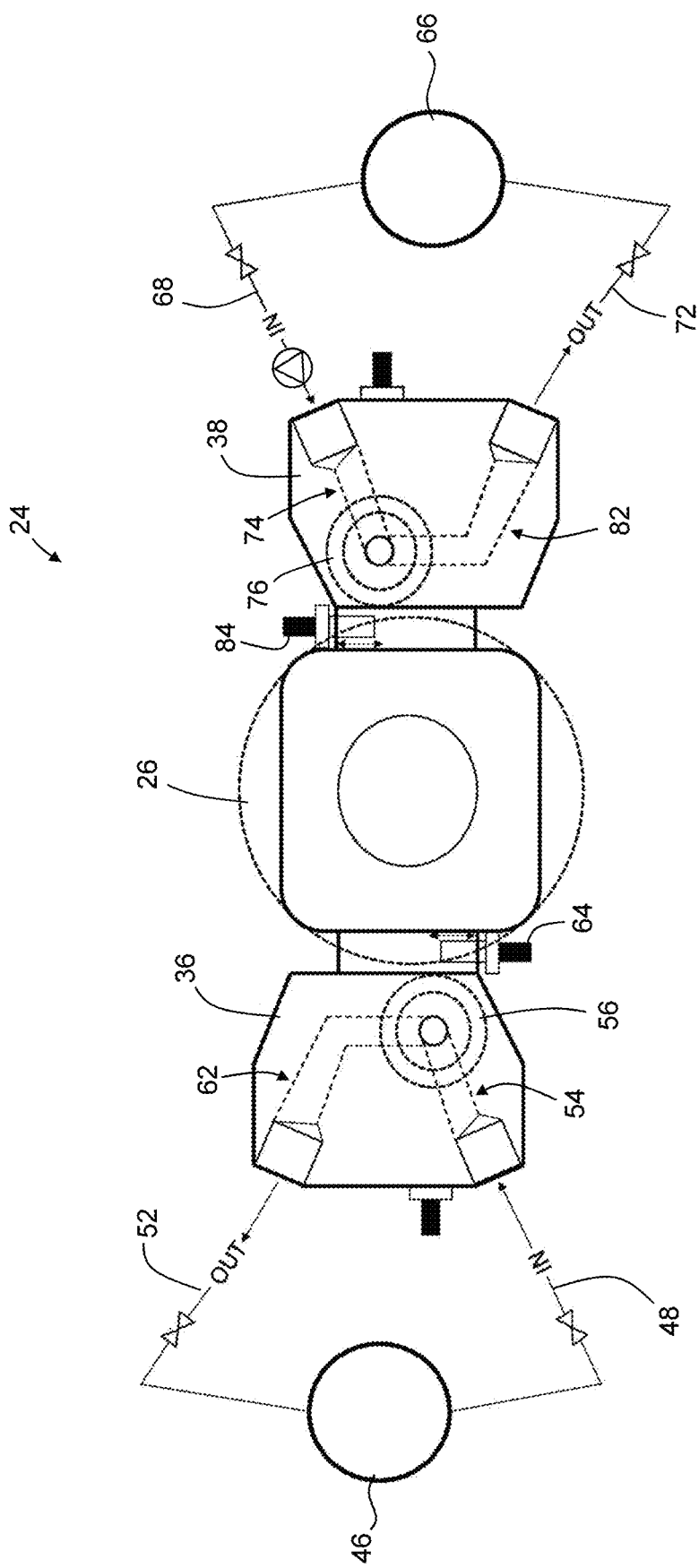
FIG. 3 is a top view of a portion of the 3D printing device of FIG. 2.

Turning now to FIGS. 1 to 3, a three-dimensional (3D) printing device for 3D printing polyurethane articles is shown, and is generally indicated by reference numeral 20. 3D printing device 20 is configured to deposit successive layers of polyurethane elastomer material in an additive manner to form a polyurethane article 22.

The 3D printing device 20 comprises a travelling dispenser 24 that is configured to travel in three dimensions in an x-y-z coordinate system, and dispense material within the x-y-z coordinate system, in response to signals received from processing structure (not shown) running a 3D printing application. The travelling dispenser 24 comprises a central body 26 having an interior defining a mixing chamber 28, and a nozzle 32 that is fluidically coupled to the mixing chamber 28. The travelling dispenser 24 also comprises a first gear pump 36 and a second gear pump 38, which are each mounted to a side of the body 26 and are each configured to deliver a metered amount of respective polyurethane reagent to the mixing chamber 28. The mixing chamber 28 accommodates a rotatable rotor 40, which is coupled to a driving motor 42 housed in the body 26. The rotor 40 is configured to rotate, in response to action by the driving motor 42, to mix the polyurethane reagents within the mixing chamber 28 and to extrude the mixed polyurethane reagents out through the nozzle 32, to deposit one or more layers of polyurethane elastomer material to form at least part of the polyurethane article 22.

The first gear pump 36 is fluidically coupled to a first polyurethane reagent supply 46 via a first polyurethane reagent feed line 48 and a first polyurethane reagent return line 52. The first polyurethane reagent supply 46 is in the form of a tank or other suitable vessel, and contains a polyol mixture, described below. The first polyurethane reagent delivery line 48 and the first polyurethane reagent return line 52 are flexible, such as hoses, tubes, and the like, and allow the travelling dispenser 24 to move relative to the first polyurethane reagent supply 46 during operation. The first polyurethane reagent delivery line 48 and the first polyurethane reagent return line 52 may, for example, each be a flexible conduit such as a hose, a tube, or the like. The first gear pump 36 comprises a feed duct 54 in fluid communication with the first polyurethane reagent feed line 48, a motorized drive gear 56 in fluid communication with the feed duct 54, a delivery duct 58 in fluid communication with the motorized drive gear 56 and the interior of the mixing chamber 28, and a return duct 62 in fluid communication with the motorized drive gear 56 and the first polyurethane reagent return line 52. The first gear pump 36 also comprises a first pour pressure adjustment valve 64, which is configured to control the flow rate of first polyurethane reagent passing through the delivery duct 58 into the mixing chamber 28.

The second gear pump 38 is fluidically coupled to a second polyurethane reagent supply 66 via a second polyurethane reagent feed line 68 and a second polyurethane reagent return line 72. The second polyurethane reagent supply 66 is in the form of a tank or other suitable vessel, and contains one or more diisocyanates, described below. The second polyurethane reagent feed line 68 and the second polyurethane reagent return line 72 are flexible, and allow the travelling dispenser 24 to move relative to the second polyurethane reagent supply 66 during operation. The second polyurethane reagent feed line 68 and the second polyurethane reagent return line 72 may, for example, each be a flexible conduit such as a hose, a tube, or the like. The second gear pump 38 comprises a feed duct 74 in fluid communication with the second polyurethane reagent feed line 68, a motorized drive gear 76 in fluid communication with the feed duct 74, a delivery duct 78 in fluid communication with the motorized drive gear 76 and the interior of the mixing chamber 28, and a return duct 82 in fluid communication with the motorized drive gear 76 and the second polyurethane reagent return line 72. The second gear pump 38 also comprises a second pour pressure adjustment valve 84, which is configured to adjustably control the flow rate of second polyurethane reagent passing through the delivery duct 78 into the mixing chamber 28.

The 3D printing device 20 comprises a solvent supply 86, which is in the form of a tank or other suitable vessel and contains a cleaning solvent for rinsing and cleaning the mixing chamber 28 and the rotor 40 during operation. The travelling dispenser 24 comprises a solvent duct 88, which is in fluidic communication with the solvent supply 86 via a solvent feed line 89, and which is in fluidic communication with the interior of the mixing chamber 28. A solvent pump 90 is installed on the solvent feed line 89, and is configured to control the flow rate of solvent passing through the solvent feed line 89 into the solvent duct 88.

The 3D printing device 20 also comprises a pressurized gas source 92 for expunging residual fluids, such as reagents and solvents, from the mixing chamber 28 and the rotor 40. To this end, the travelling dispenser 24 comprises a pressurized gas duct 94, which is in fluidic communication with the pressurized gas source 92 via a pressurized gas line 95, and which is in fluidic communication with the interior of the mixing chamber 28. A gas valve 96 is installed on the pressurized gas line 95, and is configured to control the flow of pressurized gas through the pressurized gas line 95 into the pressurized gas duct 94.

Figure 4:
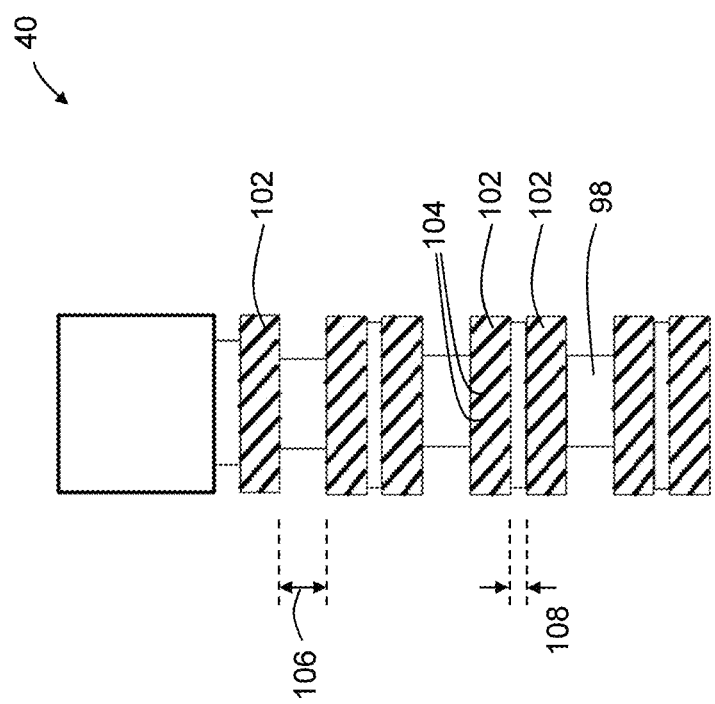
FIG. 4 is a side view of a rotor forming part of the 3D printing device of FIG. 1.

The rotor 40 may be better seen in FIG. 4. In this embodiment, the rotor 40 comprises a central shaft 98 supporting a plurality of spaced mixing wheels 102. Each mixing wheel 102 has a plurality of inclined vanes 104 formed on an outer surface thereof, for pushing fluid downward through the interior of the mixing chamber 28 and out through the nozzle 32 when the rotor 40 is rotated by the driving motor 42. As can be seen in FIG. 4, the mixing wheels 102 are spaced along the length of the shaft 98 so as to define wide gaps 106 and narrow gaps 108 therebetween. As will be understood, the gaps 106 and 108 provide mixing zones in the interior of the mixing chamber 28, in which the polyurethane reagents can more easily mix during operation.

Polyol Mixture

Turning now to the polyurethane reagents, the polyol mixture contained in the first polyurethane reagent supply 46 comprises a mixture of a hydroxy terminated polymer, a catalyst, a surfactant, and optionally at least one of a chain extender, a foaming agent, a colorant and a crosslinker. It will be understood that the polyol mixture may comprise one or more of each of the hydroxy terminated polymer, the catalyst, and the surfactant, and may comprise zero, one or more of each of the aforementioned optional components. The polyol mixture is blanketed in the first polyurethane reagent supply 46 with nitrogen to avoid oxidation, and the first polyurethane reagent supply 46 comprises heating means (not shown) for optionally heating the polyol mixture to a desired temperature.

The hydroxy terminated polymer is polyethylene oxide, polypropylene oxide, polyethylene-propylene oxide, or a polyester resin with hydroxyl end groups.

The polyethylene oxide, polypropylene oxide, or polyethylene-propylene oxide can be prepared from cationic polymerization of ethylene oxide, propylene oxide, or a mixture thereof.

The polyester resin with hydroxyl end groups can be prepared by a polycondensation process by reacting suitable organic diols and suitable organic diacids in the presence of polycondensation catalysts. Generally, a stoichiometric equimolar ratio of organic diol and organic diacid is used, however, an excess of organic diol can be selected such that the resulting polymer displays a hydroxyl number of from about 30 to about 40, an acid number of less than about 5 milligrams/gram of KOH, and more specifically, less than about 3 milligrams/gram of KOH, and with a molecular weight average of from about 1,500 to about 5,000 Daltons as determined by GPC. In some instances, where the boiling point of the organic diol is from, for example, about 180° C. to about 230° C., an excess amount of diol, such as an alkylene glycol like ethylene glycol or propylene glycol of from about 0.2 to 1 mole equivalent, can be used and removed during the polycondensation process by distillation Examples of organic diacids or diesters that can be used for preparation of the polyester resins are fumaric acid, maleic acid, oxalic acid, succinic acid, fumaric acid, itaconic acid, glutaric acid, adipic acid, suberic acid, azelaic acid, sebacic acid, 1,12-dodecane dioic acid, C-18 dimer acids, such as 1,16-octadecanedioic acid, phthalic acid, isophthalic acid, terephthalic acid, naphthalene-2,6-dicarboxylic acid, naphathalene-2,7-dicarboxylic acid, cyclohexane dicarboxylic acid, malonic acid and mesaconic acid, and diesters or anhydrides thereof. The organic diacid is selected in an amount of, for example, from about 45 to about 50 percent by weight of the polyester resin. The organic diacid selected can be obtained from biomasses generated through a fermentation process, natural sources, and/or chemically derived from natural sources, and can be, for example succinic acid, fumaric acid, itaconic acid, sebacic acid 1,12-dodecanedioic acid, 2,5-furandicarboxylic acid, azelaic acid, dimer acids, which include aliphatic dimer acids with from about 2 carbon atoms to about 36 carbon atoms, such as C-18 dimer acids, or dimerized fatty acids of dicarboxylic acids prepared by dimerizing unsaturated fatty acids obtained from tall oil, usually on clay catalysts; hydrogenated/saturated dimer acids; and other known suitable organic acids.

The organic diol selected can also be obtained from biomasses generated through a fermentation process, natural sources, and/or chemically derived from natural sources, and can be, for example 1,5-pentanediol, 1,2-propanediol(1,2-propylene glycol), 1,3-propanediol, 1,4-butanediol, 1,10-decanediol, 1,9-nonanediol, dimer diols, which include aliphatic dimer diols with from about 2 carbon atoms to about 36 carbon atoms, such as PRIPOL® and aliphatic diol reactant examples with, for example, from about 2 carbon atoms to about 36 carbon atoms, include 1,2-ethanediol, 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, 2-ethyl-2-butyl-1,3-propanediol, alkylene glycols like ethylene glycol, propylene glycol, monoethylene glycol, diethylene glycol, monopropylene glycol, dipropylene glycol, isosorbide, mixtures thereof, and the like. The organic diol is selected, for example, in an amount of from about 50 to about 60 percent by weight of the polyester.

Examples of polycondensation catalysts that can be used for the preparation of polyester resins are tetraalkyl titanates, dialkyltin oxide such as dibutyltin oxide, tetraalkyltin such as dibutyltin dilaurate, dialkyltin oxide hydroxide such as butyltin oxide hydroxide, aluminum alkoxides, alkyl zinc, dialkyl zinc, zinc oxide, stannous oxide, zinc acetate, titanium (iv) isopropoxide (Tyzor TE), other suitable known catalysts, and mixtures thereof. The one or more catalysts may be present in an amount of, for example, from about 0.01 percent by weight to about 5 percent by weight, preferably from about 0.1 to about 0.8 percent by weight, and more preferably from about 0.2 to about 0.6 percent by weight, or another suitable, percentage, based on the starting diacid or diester used to generate the polyester resins.

Examples of semi-crystalline polyester resins with, for example, a melting point equal to or less than, for example, about 50° C., such as from about 25° C. to about 49° C., include those resins derived from straight chain aliphatic organic diacids, such as succinic acid, glutaric acid, adipic acid, suberic acid, azelaic acid, sebacic acid, 1,12-dodecane dioic acid, and straight chain aliphatic organic diols, such as 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, and 1,12-dodecanediol, include polyesters containing poly(1,2-ethylene-succinate), poly(1,2-ethylene-adipate), poly(1,2-ethylene-sebacate), poly(1,2-ethylene-decanoate), poly(1,2-ethylene-nonoate), poly(1,2-ethylene-dodeanoate), poly(1,2-ethylene-azeleoate), poly(1,3-propylene-succinate), poly(1,3-propylene-adipate), poly(1,3-propylene-sebacate), poly(1,3-propylene-decanoate), poly(1,3-propylene-nonoate), poly(1,3-propylene-dodeanoate), poly(1,3-propylene-azeleoate), poly(1,4-butylene-succinate), poly(1,4-butylene-adipate), poly(1,4-butylene-sebacate), poly(1,4-butylene-decanoate), poly(1,4-butylene-nonoate), poly(1,4-butylene-dodeanoate), poly(1,4-butylene-azeleoate), poly(1,6-hexylene-succinate), poly(1,6-hexylene-adipate), poly(1,6-hexylene-sebacate), poly(1,6-hexylene-decanoate), poly(1,6-hexylene-nonoate), poly(1,6-hexylene-dodeanoate), poly(1,6-hexylene-azeleoate), poly(1,8-octylene-succinate), poly(1,8-octylene-adipate), poly(1,8-octylene-sebacate), poly(1,8-octylene-decanoate), poly(1,8-octylene-nonoate), poly(1,8-octylene-dodeanoate), poly(1,8-octylene-azeleoate), poly(1,9- nonylene-succinate), poly(1,9-nonylene-adipate), poly(1,9-nonylene-sebacate), poly(1,9-nonylene-decanoate), poly(1,9-nonylene-nonoate), poly(1,9-nonylene-dodeanoate), poly(1,9-nonylene-azeleoate), poly(1,10-decylene-succinate), poly(1,10-decylene-adipate), poly(1,10-decylene-sebacate), poly(1,10-decylene-decanoate), poly(1,10-decylene-nonoate), poly(1,10-decylene-dodeanoate), poly(1,10-decylene-azeleoate, mixtures thereof, other suitable known suitable components, and the like.

Examples of semi-crystalline polyester resins with melting points such as of from about 50° C. to about 65° C., or less than from about 50° C., such as from about 40° C. to about 49° C., or such as from about 15° C. to about 49° C., can be prepared from a mixture of at least one straight chain aliphatic organic diacid, at least one straight chain aliphatic diol, and a branched aliphatic diol, such as 1,2-propanediol, 1,3-butanediol, 2,3-butanediol, 3,3-dimethyl pentanediol; 1,5-pentanediol, mixtures thereof, and the like. The organic diacid of at least one aliphatic straight chain organic diacid is selected in an amount of, for example, from about 45 to about 50 percent by weight of the polyester resin. The straight chain aliphatic diol is selected in an amount of, for example, from about 20 to about 40 percent by weight of the polyester resin, and the branched aliphatic diol is selected in an amount of, for example, from about 20 percent by weight to about 40 percent by weight of the polyester resin. These polyester resins include copoly(1,3-propylene-succinate)-copoly(1,2-proplyene-succinate), copoly(1,4-butylene-succinate)-copoly(1,2-proplyene-succinate), copoly(1,3-propylene-sebacate)-copoly(1,2-proplyene-sebacate), copoly(1,3-propylene-dodecanoate)-copoly(1,2-proplyene-dodecanoate), copoly(1,3-propylene-azeleoate)-copoly(1,2-proplyene-azeleoate), and the like, and mixtures thereof.

Amorphous polyester resins usually do not possess a melting point, and instead have a glass transition temperature of, for example, from about −25° C. to about 10° C. Examples of amorphous polyester resin that can be used for the preparation of the polyurethane elastomer can be prepared from a mixture of at least one or more straight chain aliphatic diacids, branched aliphatic diols with optionally one or more straight chain aliphatic diols. The straight chain aliphatic diol is selected in an amount of, for example, from about 45 to about 50 percent by weight of the polyester resin, and the branched aliphatic diol is selected in an amount of, for example, from about 30 to about 55 percent by weight of the polyester resin, and the optionally one or more straight chain aliphatic diols is selected in an amount of, for example, from about 0 to about 20 percent by weight of the polyester resin. These amorphous polyester resins include copoly(1,2-propylene-succinate)-copoly(1,2-proplyene-sebacate), copoly(1,2-propylene-succinate)-copoly(1,2-proplyene-dodecanoate), copoly(1,2-propylene-sebacate)-copoly(1,2-proplyene-dodecanoate), copoly(1,2-propylene-dodecanoate)-copoly(1,2-proplyene-azeloate), copoly(1,2-propylene-azeleoate)-copoly(1,2-proplyene-succinate), poly(butylene-succinate), poly(butylene-2,5-furanate), poly(butylene-itaconate), poly(propylene-succinate), poly(propylene-2,5-furanate), poly(propylene-itaconate), and the like, and mixtures thereof.

The amorphous polyester resin, the semi-crystalline polyester resin, or mixtures thereof, can be present in the polyurethane elastomer in an amount of, for example, from about 1 to about 99 percent by weight of the polyurethane elastomer, preferably from about 10 to about 85 percent by weight, more preferably from about 18 to about 75, more preferably from about 25 to about 65, still more preferably from about 30 to about 55, and most preferably from about 40 to about 60 percent by weight of the polyurethane elastomer.

Examples of plasticizer that may be used for preparation of the polyurethane elastomer are tributyl-citrate, CITROFOL® available from Jungbunzlauer, Hallstar IM 8830, an ester available from Hallstar, triethyl-citrate; trimethyl-citrate, adipates such as EDENOL® 650R available from Emery Olechemicals, tributyl citrate, alkyl aryl phthalates, alkyl benzyl phthalates, including butyl benzyl phthalate, alkyl benzyl phthalate, wherein the alkyl group has a carbon chain of from seven to nine carbon atoms, TEXANOL™, benzyl phthalate, (2,2,4-trimethyl-1,3-pentanediol-monobutyrate benzyl phthalate), alkylphenyl phthalate, symmetrical and unsymmetrical dialkyl phthalates, including diisononyl phthalate, diisodecyl phthalate, dioctyl phthalate, di-n-butyl phthalate, dioctyl phthalate, dihexyl phthalate, diheptyl phthalate, butyloctyl phthalate, linear dialkyl phthalate, wherein the alkyl groups are independently carbon chains having from about seven to about eleven carbon atoms, and butyl cyclohexyl phthalate; phosphate plasticizers, such as tris-(2-chloro-1-methylethyl)phosphate, tris-(alpha-chloroethyl)phosphate (TCEP), tris-(2,3-dichloro-1-propyl)phosphate, YOKE-V6 (tetrakis-(2-chloroethyl)dichloroisopentyldiphosphate), and the like; phosphate ester plasticizers, such as, for example, 2-ethylhexyl diphenyl phosphate, isodecyl diphenyl phosphate, mixed dodecyl and tetradecyl diphenyl phosphate, trioctyl phosphate, tributyl phosphate, butylphenyl diphenyl phosphate, and isopropylated triphenyl phosphate; and benzoate plasticizers, such as, for example, TEXANOL™ benzoate (which is 2,2,4-trimethyl-1,3-pentanediol-monobutyrate benzoate), glycol benzoate, propylene glycol dibenzoate, dipropylene glycol is dibenzoate, and tripropylene glycol dibenzoates. The one or more plasticizers may be present in an amount of, for example, from about 1 to about 30 percent by weight, and preferably from about 1 to about 15 percent by weight based on the amount of the polyurethane elastomer.

Examples of crosslinker that may be used for preparation of the polyurethane elastomer are diethanolamine, glycerol, trimethylol propane, pentaerythritol, 1,2,4-butanetriol, thioglycolic acid, 2,6-dihydroxybenzoic acid, melamine, diglycolamine, 1,2,6-hexanetriol, glycerol, 1,1,1-trimethylolethane, 1,1,1-trimethylolpropane (TMP), pentaerythritol, triisopropanol amine, triethanol amine, tartaric acid, citric acid, malic acid, trimesic acid, trimellitic acid, trimellitic anhydride, pyromellitic acid, and pyromellitic dianhydride; trimethylolpropane, trimethylolethane; pentaerythritol, polyethertriols, tartaric acid, citric acid, malic acid, trimesic acid, trimellitic acid, trimellitic anhydride, pyromellitic acid, and pyromellitic dianhydride; trimethylolpropane, trimethylolethane; pentaerythritol, polyethertriols, and glycerol, and especially polyols, such as trimethylolpropane, pentaerythritol, bio-based materials thereof, and other known suitable crosslinkers. The one or more crosslinkers may be present in an amount of, for example, from about 0.1 to about 10 percent by weight, and preferably from about 0.1 to about 5 percent by weight of the polyurethane elastomer.

Examples of chain extenders that can be used for preparation of the polyurethane elastomer are alcohols, such as polyhydric alcohols, and carboxylic acid derivatives having two functional groups. In particular, the chain extender may contain, for example, two hydroxyl moieties such as 1,2-ethanediol, 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, 2-ethyl-2-butyl 1,3-propanediol; alkylene glycols, like ethylene glycol, propylene glycol, monoethylene glycol, diethylene glycol, monopropylene glycol, dipropylene glycol, mixtures thereof, other known suitable chain extenders, and the like. The one or more chain extenders may be present in an amount of, for example, from about 0.1 to about 10 percent by weight, and preferably from about 0.1 to about 5 percent by weight of the polyurethane elastomer.

Examples of surfactant that can be used for preparation are polyether-silicone oil mix (TEGOSTAB® B4113) available from Evonik, 8383, silicone surfactant DABCO DC® 193, and TEGOSTAB® B8383 available from Evonik, sodium dodecylbenzene sulfonate, sodium dodecylnaphthalene sulfate, dialkylbenzenealkyl, sulfates and sulfonates, adipic acid, available from Aldrich, NEOGEN R™, NEOGEN SC™, available from Daiichi Kogyo Seiyaku, polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxypoly(ethyleneoxy) ethanol, available from Rhodia as IGEPAL CA-210™, IGEPAL CA-520™, IGEPAL CA-720™ IGEPAL CO-890™, IGEPAL CO-720™, IGEPAL CO-290™, ANTAROX890™ ANTAROX897™, mixtures thereof, and other suitable known surfactants. The one or more surfactants may be present in an amount of, for example, from about 0.1 to about 10 percent by weight, and preferably from about 0.1 to about 3 percent by weight of the polyurethane elastomer.

Examples of polycondensation catalyst that may be used for preparation of the crystalline, semi-crystalline and/or amorphous polyester resins, are tetraalkyl titanates, dialkyltin oxide such as dibutyltin oxide, tetraalkyltin such as dibutyltin dilaurate, dialkyltin oxide hydroxide such as butyltin oxide hydroxide, aluminum alkoxides, alkyl zinc, dialkyl zinc, zinc oxide, stannous oxide, zinc acetate, titanium (iv) isopropoxide (Tyzor TE), other suitable known catalysts, and mixtures thereof. The one or more polycondensation catalysts may be present in an amount of, for example, from about 0.01 to about 5 percent by weight, preferably from about 0.1 to about 0.8 percent by weight, and more preferably from about 0.2 to about 0.6 percent by weight, or still other suitable percentages, based on the starting weight of the diacid(s) or diester(s) used to generate the polyester resin.

Examples of catalyst that can be used for preparation of the polyurethane elastomer, and which can be present therein, are known tertiary amines, such as triethylamine, dimethylcyclohexylamine, N-methylmorpholine, N,N'-dimethylpiperazine, 2-(dimethylaminoethoxy)ethanol, diazabicyclo[2.2.2]octane, DAPCO 33 LV (33 percent triethylenediamine dissolved in 67 percent dipropylene glycol), BICAT 8109 (bismuth neodecanoate), Jeffcat-Zf-54 (bis-(2-dimethylaminoethyl)ether in dipropylene glycol), KOSMOS® 75 MEG, and the like, organometallic compounds, such as titanic esters, iron compounds, tin compounds, such as tin diacetate, tin dioctoate, tin dilaurate, the dialkyl tin salts of aliphatic carboxylic acids like dibutyltin diacetate and dibutyltin dilaurate, other suitable catalysts, and the like. More specifically, the one or more catalysts used may be organometallic compounds such as titanic esters, iron compounds, tin compounds, and other suitable known catalysts. The one or more catalysts may be present in an amount of, for example, from about 0.1 to about 5 percent by weight, and preferably from about 0.1 to about 1 percent of the weight of the polyurethane elastomer.

The one or more catalysts used for preparation of the polyester resin, which are in turn used for preparation of polyurethane elastomer, remain in the polyurethane elastomer or are otherwise retained therein. Thus, purification processes can advantageously be avoided for polyester synthesis, and products thereof, and for preparation of the polyurethane elastomer.

Examples of colorant that can be used for preparation of the polyurethane elastomer are pigments, dyes, mixtures thereof, and the like. Some specific examples of pigments and dyes are inorganic pigments, such as carbon black, whiteners, such as titanium oxide which has weather resistance, and organic pigments and dyes, such as phthalocyanine blue, azo dyes, Indigo, Congo Red, Methyl Orange, Malachile Green, purple dyes, brown dyes, black dyes, Pigment Blue 15:3 or C.I. Pigment Blue 15:4, phthalocyanine green, quinacridone red, indanthrene orange, and isoindolinone yellow, C.I. Pigment Red 254 and C.I. Pigment Red 122, C.I. Pigment Yellow 151 and C.I. Pigment Yellow 74, Fates Dye and Keen Dye available from BAO Shen Polyurethane Tech. LTD-China, and other suitable known colorants, such as known dyes and pigments illustrated in the Color Index (C.I.), such as known magenta, yellow, and cyan colorants. The one or more colourants can be present in an amount of, for example, from about 1 to about 10 percent by weight, preferably from about 0.1 to about 5 percent by weight, and more preferably from about 0.1 to about 3 percent by weight of the polyurethane elastomer.

Foaming agents (or blowing agents), when present in the reaction mixture, are known to increase the firmness of the resulting polyurethane elastomer foam. For example, a soft, flexible, plasticized water-blown polyurethane foam composition can be produced from the reaction of a natural polyol and methylene diphenyl diisocyanate, (MDI) or an equivalent isocyanate, and by optionally adding a plasticizer.

Examples of foaming agent (or blowing agent) that may be used for preparation of the polyurethane elastomer are water, compressed gases, such as $CO_2$, $N_2$, air or low boiling liquids like cyclopentane, pentane, isobutane, and hydrofluorocarbons, and may be added in an amount of, for example, from about 0.03 to about 10 percent by weight, and preferably from about 0.5 to about 3 percent by weight of the polyurethane elastomer. Additionally, $CO_2$ may be generated in-situ by decomposition of $NaHCO_3$ or the reaction of water with isocyanate.

Organic Diisocyanates

Turning now to the second polyurethane reagent supply 66, the one or more diisocyanates are blanketed with nitrogen in the second polyurethane reagent supply 66 to avoid oxidation, and the second polyurethane reagent supply 66 comprises heating means (not shown) for optionally heating the organic diisocyanates to a desired temperature.

Examples of organic diisocyanate that may be contained in the second polyurethane reagent supply 66, and therefore used for preparation of the polyurethane elastomer, are aliphatic diisocyanates, such as hexamethylene diisocyanate, cycloaliphatic diisocyanates, such as isophorone diisocyanate, cyclohexane 1,4-diisocyanate, 1-methylcyclohexane 2,4-diisocyanate, and 1-methylcyclohexane 2,6-diisocyanate, and the corresponding isomer mixtures, dicyclohexylmethane 4,4'-diisocyanate, dicyclohexylmethane 2,4'-diisocyanate, dicyclohexylmethane 2,2'-diisocyanate, and the corresponding isomer mixtures, aromatic diisocyanates, such as tolylene 2,4-diisocyanate, mixtures of tolylene 2,4-diisocyanate and tolylene 2,6-diisocyanate, diphenylmethane 4,4'-diisocyanate, diphenylmethane 2,4'-diisocyanate, and diphenylmethane 2,2'-diisocyanate, mixtures of diphenylmethane 2,4'-diisocyanate and diphenylmethane 4,4'-diisocyanate, urethane-modified liquid diphenylmethane 4,4'-diisocyanates or diphenylmethane 2,4'-diisocyanates, 4,4'-diisocyanato-1,2-diphenylethane, and naphthylene 1,5-diisocyanate. Especially selected diisocyanates are hexamethylene 1,6-diisocyanate, cyclohexane 1,4-diisocyanate, isophorone diisocyanate, dicyclohexylmethane diisocyanate, diphenylmethane diisocyanates with more than 96 percent by weight content of diphenylmethane 4,4'-diisocyanate, diphenylmethane 4,4'-diisocyanate, and naphthylene 1,5-diisocyanate, suitable known diisocyanates, and mixtures thereof.

In embodiments, there can be selected mixtures of a diisocyanate and a polyisocyanates for providing an improved thermoplastically processable product. The polyisocyanates are preferably present in an amount of about 15 percent by weight, based on the total diisocyanates present, however, up to about 40 percent by weight of polyisocyanate can be added. Some examples of polyisocyanates are triisocyanates, biurets and isocyanurate trimer. For example, triphenylmethane 4,4',4"-triisocyanate and polyphenylpolymethylene polyisocyanates as well as hexamethylene diisocyanate (HDI) biuret trimer, isocyanurate trimer, and isophorone (IPDI) isocyanurate trimer, can be used.

Cleaning Solvents

The cleaning solvent contained in the solvent supply 86 may include, for example, one or more of aprotic nonpolar, aprotic polar and protic solvents. Suitable aprotic nonpolar solvents are as aromatic hydrocarbons, aliphatic hydrocarbons (alkanes (paraffins) and olefins), carboxylic esters and polyesters, (poly)ethers and/or halogenated hydrocarbons of low polarity. Suitable aprotic polar solvents are selectable for example from the following classes of substances or substance classes comprising the following functional groups: ketones, lactones, lactams, nitriles, carboxamides, sulphoxides and/or sulphones. Suitable protic solvents are selectable for example from the following classes of substances or substance classes comprising the following functional groups: alcohols, polyols, (poly)alkylene glycols, amines, carboxylic acids, in particular fatty acids and/or primary and secondary amides.

Some preferred examples of solvents are dibasic esters, such as mixtures of different methyl dibasic esters of adipic acid, glutaric acid, and succinic acid and available from Invista as DBE®, esters of dibasic acids such as the ethyl, propyl, butyl and hexyl ester of dibasic acids. Other examples of suitable solvents are mineral oils, hexane, pentane, heptane, decane or mixtures of saturated hydrocarbons, for example Kaydol products from Sonneborn, natural oil components selected from the group consisting of soya bean oil, Lincoln bean oil, Manchurian bean oil, maize oil, safflower oil, palm oil, linseed oil, sesame oil, perilla oil, dehydrated castor oil, olive oil, sunflower oil, rapeseed oil and further related oils or mixtures thereof, glycol ethers such as ethylene glycol dimethyl ether (monoglyme), bis(2-methoxyethyl) ether (diglyme), triethylene glycol dimethyl ether (triglyme), tetraethylene glycol dimethyl ether (tetraglyme), polyester and polyether polyols, polyols based on renewable raw materials (NOPs), end-capped polyethers, preferably dialkyl polyethers having, as alkyl radicals, butyl/methyl, methyl/methyl or butyl/butyl radicals, preferably those obtainable from diol-started polyethers, glycols, glycerol, carboxylic esters, preferably fatty acid esters, for example ethyl acetate and isopropyl myristate, polycarbonates, phthalates, preferably dibutyl phthalate (DBP), dioctyl phthalate (DNOP), diethylhexyl phthalate (DEHP), diisononyl phthalate (DINP), dimethyl phthalate (DMP), diethyl phthalate (DEP), cyclohexanoates, preferably diisononyl cyclohexanoate (DINCH), and diisoundecyl phthalate (DIUP).

Turning again to the Figures, As noted above, the travelling dispenser 24 is configured to travel in three dimensions in the x-y-z coordinate system, and dispense material within the x-y-z coordinate system, to form the polyurethane article 22. The travelling dispenser 24 is motorized, and comprises a translation motor (not shown) for moving the travelling dispenser 24 in either direction along a linear support rail 112 (see FIG. 5), which defines an x-direction of the x-y-z coordinate system. The support rail 112 is, in turn, configured to be moved in either direction along one or two linear secondary rails (not shown) which define a y-direction of the x-y-z coordinate system, by motorized means (not shown). The one or more secondary rails are, in turn, configured to be moved linearly and in either direction (namely, up or down) by a motorized elevation means (not shown), which defines a z-direction of the x-y-z coordinate system.

The motors for controlling movement of the travelling dispenser 24 within the x-y-z coordinate system, the motorized drive gear 56 of the first gear pump 36, the motorized drive gear 76 of the second gear pump 38, the driving motor 42, the solvent pump 90, and the pressurized gas valve 96, are all in communication with the processing structure via wired and/or wireless connection. The processing structure may be, for example, a desktop computer, a laptop computer, a smartphone, a tablet computer, and the like. The 3D printing application running on the processing structure may be, for example, a computer program stored in memory in communication with the processing structure, and includes computer-readable code comprising instructions.

Figure 5:
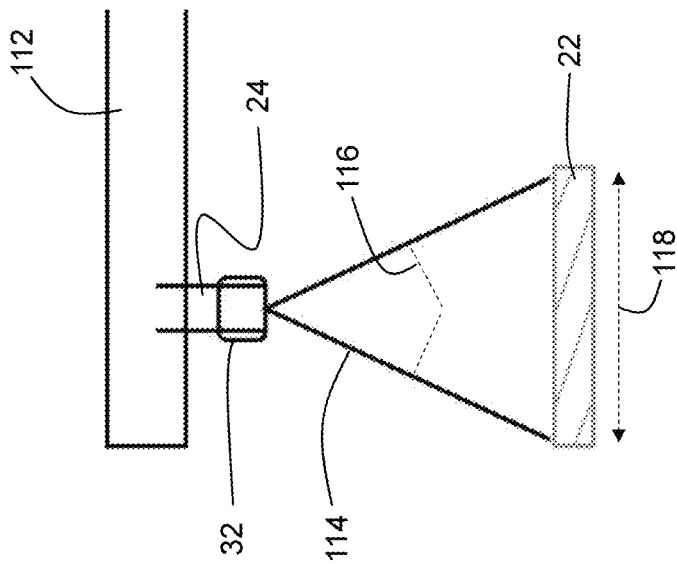
FIG. 5 is a schematic side view of a nozzle forming part of the 3D printing device of FIG. 1, in use.

In use, the 3D printing device 20 is operated in accordance with signals received from the processing structure. In particular, the processing structure processes the instructions of the computer-readable code, and generates and sends i) movement signals to the motors controlling movement of the travelling dispenser 24 within the x-y-z coordinate system, ii) polyol mixture pump signals to the motorized drive gear 56, iii) diisocyanate pump signals to the motorized drive gear 76, and iv) extrusion signals to the driving motor 42. In response to the movement signals (i), the motors controlling movement of the travelling dispenser 24 are activated, so as to position the travelling dispenser 24 (and in particular, the outlet of the nozzle 32) at a desired location within the x-y-z coordinate system. In response to the polyol mixture pump signals (ii), the motorized drive gear 56 of the first gear pump 36 is activated, which drives flow of polyol mixture from the first polyurethane reagent supply 46 via the first polyurethane reagent feed line 48, the feed duct 54, through the delivery duct 58 into the interior of the mixing chamber 28; excess polyol mixture not entering the delivery duct 58 is returned to the first polyurethane reagent supply 46 via the return duct 62 and the first polyurethane reagent return line 52. In response to the diisocyanate pump signals (iii), the motorized drive gear 76 of the second gear pump 38 is activated, which drives flow of diisocyanate from the second polyurethane reagent supply 66 via the second polyurethane reagent feed line 68, the feed duct 74, through the delivery duct 78 into the interior of the mixing chamber 28; excess diisocyanate not entering the delivery duct 78 is returned to the second polyurethane reagent supply 66 via the return duct 85 and the second polyurethane reagent return line 72. In response to the extrusion signals (iv), the driving motor 42 is activated, which causes the rotor 40 to rotate; rotation of the rotor 40 mixes the polyol mixture and the diisocyanate within the mixing chamber 28, and extrudes the mixed polyurethane reagents out through the nozzle 32 as a conical spray 114, as shown in FIG. 5. The nozzle 32 is adjustable, allowing a spray angle 116 within the conical spray 114 of polyurethane reagents to be increased or decreased, so as to increase or decrease the deposition width 118 of the conical spray 114 to a desired size.

As will be understood, the kinetics of the polyurethane reaction are such that the mixed polyurethane reagents (specifically, the hydroxy terminated polymer and the one or more diisocyanates in the presence of the catalyst) react after extrusion from the nozzle 32 to form a layer of polyurethane elastomer material, and thereby form at least a portion of the polyurethane article 22 through deposition.

At a desired time subsequent to deposition, and after having moved the travelling dispenser (and hence the nozzle 32) to a position within the x-y-z coordinate system away from the polyurethane article 22, the processing structure generates and sends v) solvent pump signals to the solvent pump 90, and vi) air purge signals to the pressurized gas valve 96. In response to the solvent pump signals (v), the solvent pump 90 is activated, which drives flow of solvent from the solvent supply 86 via the solvent feed line 89, through the solvent duct 88 into the mixing chamber 28. The solvent rinses and dissolves residual polyurethane reagents in the mixing chamber 28 and on the surface of the rotor 40, and flows out of the nozzle 32 for disposal. In response to the air purge signals (vi), the pressurized gas valve 96 is temporarily opened, and a burst of pressurized gas flows from the pressurized gas source 92 via the pressurized gas line 95, through the pressurized gas duct 94 and into the mixing chamber 28. The pressurized gas expunges residual fluids, such as reagents and solvent, out of the nozzle 32 for disposal.

Figure 6:
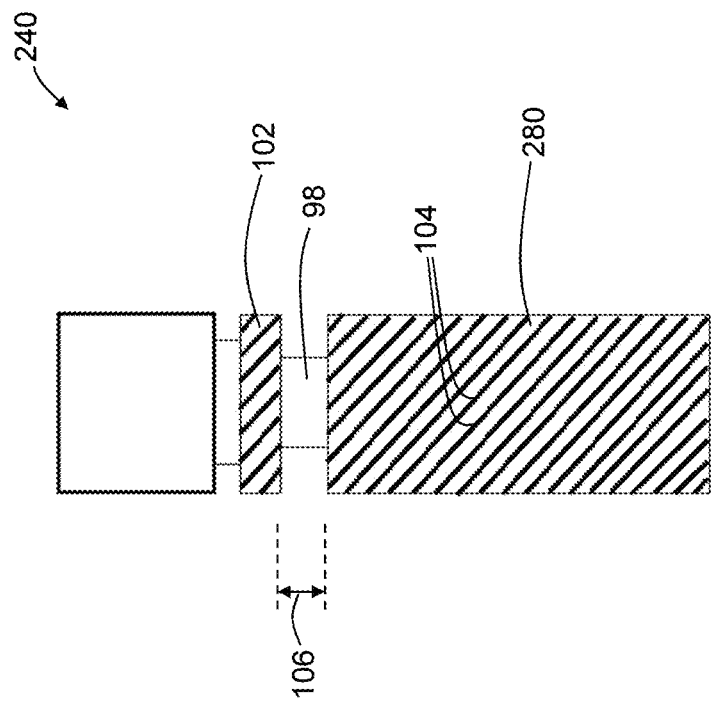
FIG. 6 is a side view of another embodiment of a rotor for use with the 3D printing device of FIG. 1.

The 3D printing device is not limited the configuration described above and in other embodiments, the 3D printing device may be differently configured. For example FIG. 6 shows another embodiment of a rotor for use with the 3D printing device 20, and which is generally indicated by reference numeral 240. Rotor 240 is generally similar to rotor 40 described above, and comprises a central shaft 98 supporting a single mixing wheel 102 and a mixing rod 280. The mixing wheel 102 is similar to that described above. The mixing rod 280 is sized so as to have a greater length than the mixing wheel 102 and, similar to mixing wheel 102 has a plurality of inclined vanes 104 formed on an outer surface thereof for pushing fluid downward through the interior of the mixing chamber 28 and out through the nozzle 32, when the rotor 240 is rotated by the driving motor 42. As can be seen in FIG. 6, the mixing wheel 102 and the mixing rod 280 are spaced along the length of the shaft 98 to define a wide gap 106 therebetween. As will be understood, the gap 106 provides a mixing zone in the interior of the mixing chamber 28, in which the polyurethane reagents can more easily mix during operation.

It will be understood that, in other embodiments, the rotor may alternatively comprise a different arrangement of mixing wheels and/or mixing rods, spaced by different amounts, so as to provide a desired number and volume of mixing zones.

Figure 7:
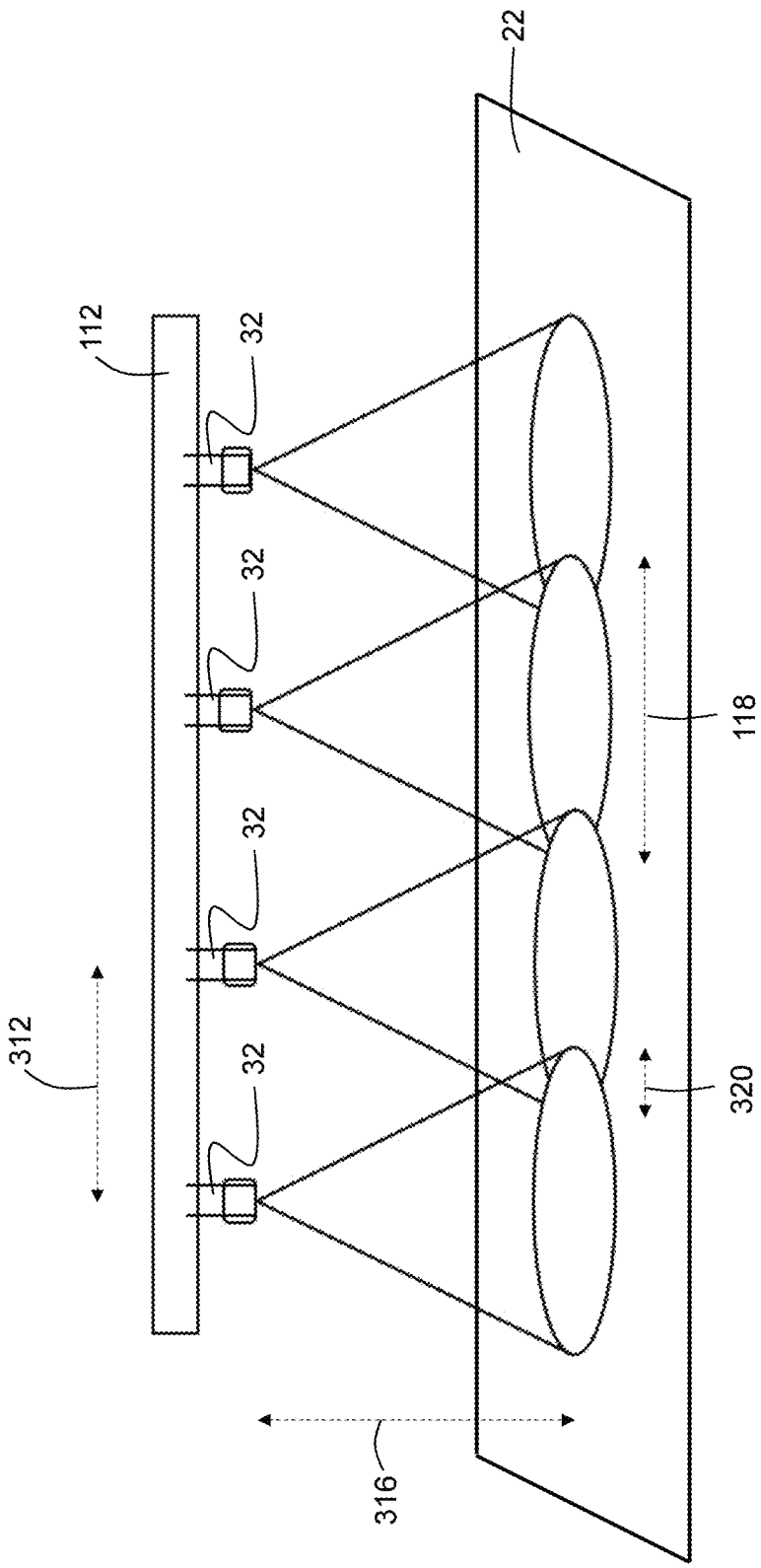
FIG. 7 is a side view of a portion of another embodiment of a 3D printing device for polyurethane articles, comprising a plurality of spray nozzles, in use.

In other embodiments, the printing device may alternatively comprise a plurality of spray nozzles 32, as shown in FIG. 7. In the example shown, four (4) spray nozzles 32 are arranged along linear support rail 112 such that they are spaced from each other by a nozzle spacing 312, and are spaced above the surface of the polyurethane article 22 by a nozzle height 316. The printing device may have anywhere from two (2) to ten (10) of the spray nozzles 32, or still more spray nozzles 32. Owing to the conical shape of the spray exiting each spray nozzle 32 has a deposition width 118, and the conical sprays of adjacent spray nozzles 32 overlap within an overlap area 320. As will be understood, the size of the overlap area 320 is a function of both the nozzle spacing 312 and the nozzle height 316, and can be adjusted to a desired size by adjusting one or more of the nozzle spacing 312, the nozzle height 316 and the deposition width 118.

Although embodiments have been described above with reference to the accompanying drawings, those of skill in the art will appreciate that variations and modifications may be made without departing from the scope thereof as defined by the appended claims.

What is claimed is:

1. A 3D printing device comprising:
    a travelling dispenser comprising:
        a mixing chamber,
        a nozzle,
        a first gear pump, and
        a second gear pump, each of the first gear pump and the second gear pump being in fluid communication with the mixing chamber via a respective delivery duct, the mixing chamber being in fluid communication with the nozzle;
    a first polyurethane reagent supply in fluid communication with the first gear pump, the first polyurethane reagent supply comprising a polyol mixture; and
    a second polyurethane reagent supply in fluid communication with the second gear pump, the second polyurethane reagent supply comprising a diisocyanate,
    wherein the travelling dispenser further comprises:
        a driving motor, and
        a rotatable rotor housed within the mixing chamber and coupled the driving motor, the rotor being configured to rotate in response to action from the driving rotor, the rotor comprising at least two mixing wheels separated by a respective gap, the gap defining a mixing zone for mixing the polyol mixture and the diisocyanate, and
    wherein the delivery ducts are positioned below an uppermost mixing wheel in the mixing chamber.

2. The 3D printing device of claim 1, wherein each gear pump comprises a drive gear and a pour pressure adjustment valve.

3. The 3D printing device of claim 1, wherein the polyol mixture comprises a hydroxy terminated polymer, a catalyst, and a surfactant.

4. The 3D printing device of claim 3, wherein the hydroxy terminated polymer comprises one or more of: polyethylene oxide, polypropylene oxide, polyethylene-propylene oxide, a polyester resin with hydroxyl end groups, and mixtures thereof.

5. The 3D printing device of claim 3, wherein the polyol mixture further comprises one or more of: a chain extender, a blowing agent, a colorant, and a crosslinker.

6. The 3D printing device of claim 1, wherein the diisocyanate comprises one or more of: hexamethylene diisocyanate, isophorone diisocyanate, cyclohexane 1,4-diisocyanate, 1-methylcyclohexane 2,4-diisocyanate, 1-methylcyclohexane 2,6-diisocyanate, dicyclohexylmethane 4,4'-diisocyanate, dicyclohexylmethane 2,4'-diisocyanate, dicyclohexylmethane 2,2'-diisocyanate, aromatic diisocyanates, tolylene 2,4-diisocyanate, tolylene 2,6- diisocyanate, diphenylmethane 4,4'-diisocyanate, diphenylmethane 2,4'-diisocyanate, diphenylmethane 2,2'-diisocyanate, diphenylmethane 4,4'-diisocyanate, urethane-modified liquid diphenylmethane 4,4'-diisocyanate, urethane-modified liquid diphenylmethane 2,4'-diisocyanate, 4,4'-diisocyanato-1,2-diphenylethane, naphthylene 1,5-diisocyanate, corresponding isomers thereof, and mixtures thereof.

7. The 3D printing device of claim 1, further comprising:
a cleaning solvent supply; and
a pressurized gas source, each of the cleaning solvent supply and the pressurized gas source being in respective fluid communication with the mixing chamber.

8. The 3D printing device of claim 1, further comprising from 2 to 10 of the travelling dispensers arranged in an array.

9. A method of 3D printing a polyurethane article comprising:
introducing, using a first gear pump, a first polyurethane reagent into a mixing chamber of a travelling dispenser, the first polyurethane reagent comprising a polyol mixture;
introducing, using a second gear pump, a second polyurethane reagent into the mixing chamber of the travelling dispenser, the second polyurethane reagent comprising a diisocyanate; and
operating a driving motor coupled to a rotor housed in the mixing chamber, the rotor being configured to rotate in response to action from the driving rotor to mix the first polyurethane reagent and the second polyurethane reagent in the mixing chamber to form a polyurethane reagent mixture and extrude the polyurethane reagent mixture out of a nozzle onto a substrate, the extruded polyurethane reagent mixture forming at least a portion of the polyurethane article,
wherein each of the first gear pump and the second gear pump are in fluid communication with the mixing chamber via a respective delivery duct,
wherein the mixing chamber is in fluid communication with the nozzle,
wherein the rotor comprises at least two mixing wheels separated by a respective gap, the gap defining a mixing zone for mixing the polyol mixture and the diisocyanate, and
wherein the delivery ducts are positioned below an uppermost mixing wheel in the mixing chamber.

10. The method of claim 9, wherein the travelling dispenser is in communication with processing structure, and wherein the steps of introducing using the first gear pump, introducing using the second gear pump, and operating the driving motor, are carried out in response to signals output by the processing structure.

11. The method of claim 9, further comprising, during said operating, moving the travelling dispenser in one or more directions.

12. The method of claim 9, wherein the polyol mixture comprises a hydroxy terminated polymer, a catalyst, and a surfactant.

13. The method of claim 12, wherein the hydroxy terminated polymer comprises one or more of: polyethylene oxide, polypropylene oxide, polyethylene-propylene oxide, a polyester resin with hydroxyl end groups, and mixtures thereof.

14. The method of claim 12, wherein the catalyst comprises one or more of:
triethylamine, dimethylcyclohexylamine, N-methylmorpholine, N,N'-dimethylpiperazine, 2-(dimethylaminoethoxy) ethanol, diazabicyclo [2.2.2] octane, bismuth neodecanoate), (bis-(2-dimethylaminoethyl)ether in dipropylene glycol), tin diacetate, tin dioctoate, tin dilaurate, the dialkyl tin salts of aliphatic carboxylic acids like dibutyltin diacetate, dibutyltin dilaurate, and mixtures thereof.

15. The method of claim 12, wherein surfactant comprises one or more of:
polyether-silicone oil sodium dodecylbenzene sulfonate, sodium dodecylnaphthalene sulfate, dialkylbenzenealkyl, sulfates polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxypoly (ethyleneoxy), and mixtures thereof.

16. The method of claim 12, wherein the polyol mixture further comprises one or more of: a chain extender, a blowing agent, a colorant, and a crosslinker.

17. The method of claim 16, wherein the crosslinker comprises one or more of: diethanolamine, glycerol, trimethylol propane, pentaerythritol, 1,2,4-butanetriol, thioglycolic acid, 2,6-dihydroxybenzoic acid, melamine, diglycolamine, 1,2,6-hexanetriol, glycerol, 1,1,1-trimethylolethane, 1,1,1-trimethylolpropane, pentaerythritol, triisopropanol amine, triethanol amine, tartaric acid, citric acid, malic acid, trimesic acid, trimellitic acid, trimellitic anhydride, pyromellitic acid, pyromellitic dianhydride; trimethylolpropane, trimethylolethane;
pentaerythritol, polyethertriols, tartaric acid, citric acid, malic acid, trimesic acid, trimellitic acid, trimellitic anhydride, pyromellitic acid, pyromellitic dianhydride, trimethylolpropane, trimethylolethane; pentaerythritol, polyethertriols, and mixtures thereof.

18. The method of claim 16, wherein the chain extender comprises one or more of: 1,2-ethanediol, 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, 2-ethyl-2-butyl 1,3-propanediol; alkylene glycols, like ethylene glycol, propylene glycol, monoethylene glycol, diethylene glycol, monopropylene glycol, dipropylene glycol, and mixtures thereof.

19. The method of claim 9, wherein the diisocyanate comprises one or more of: hexamethylene diisocyanate, isophorone diisocyanate, cyclohexane 1,4-diisocyanate, 1-methylcyclohexane 2,4-diisocyanate, 1-methylcyclohexane 2,6-diisocyanate, dicyclohexylmethane 4,4'-diisocyanate, dicyclohexylmethane 2,4'-diisocyanate, dicyclohexylmethane 2,2'-diisocyanate, aromatic diisocyanates, tolylene 2,4-diisocyanate, tolylene 2,6-diisocyanate, diphenylmethane 4,4'-diisocyanate, diphenylmethane 2,4'-diisocyanate, diphenylmethane 2,2'-diisocyanate, diphenylmethane 4,4'-diisocyanate, urethane-modified liquid diphenylmethane 4,4'-diisocyanate, urethane-modified liquid diphenylmethane 2,4'-diisocyanate, 4,4'-diisocyanato-1,2-diphenylethane, naphthylene 1,5-diisocyanate, corresponding isomers thereof, and mixtures thereof.

20. The 3D printing device of claim 1, wherein the rotor comprises a central shaft supporting said at least two mixing wheels, said at least two mixing wheels being spaced along the length of the shaft.

21. The 3D printing device of claim 1, wherein each mixing wheel comprises a plurality of vanes for pushing fluid toward the nozzle.

\* \* \* \* \*